Figure 1:
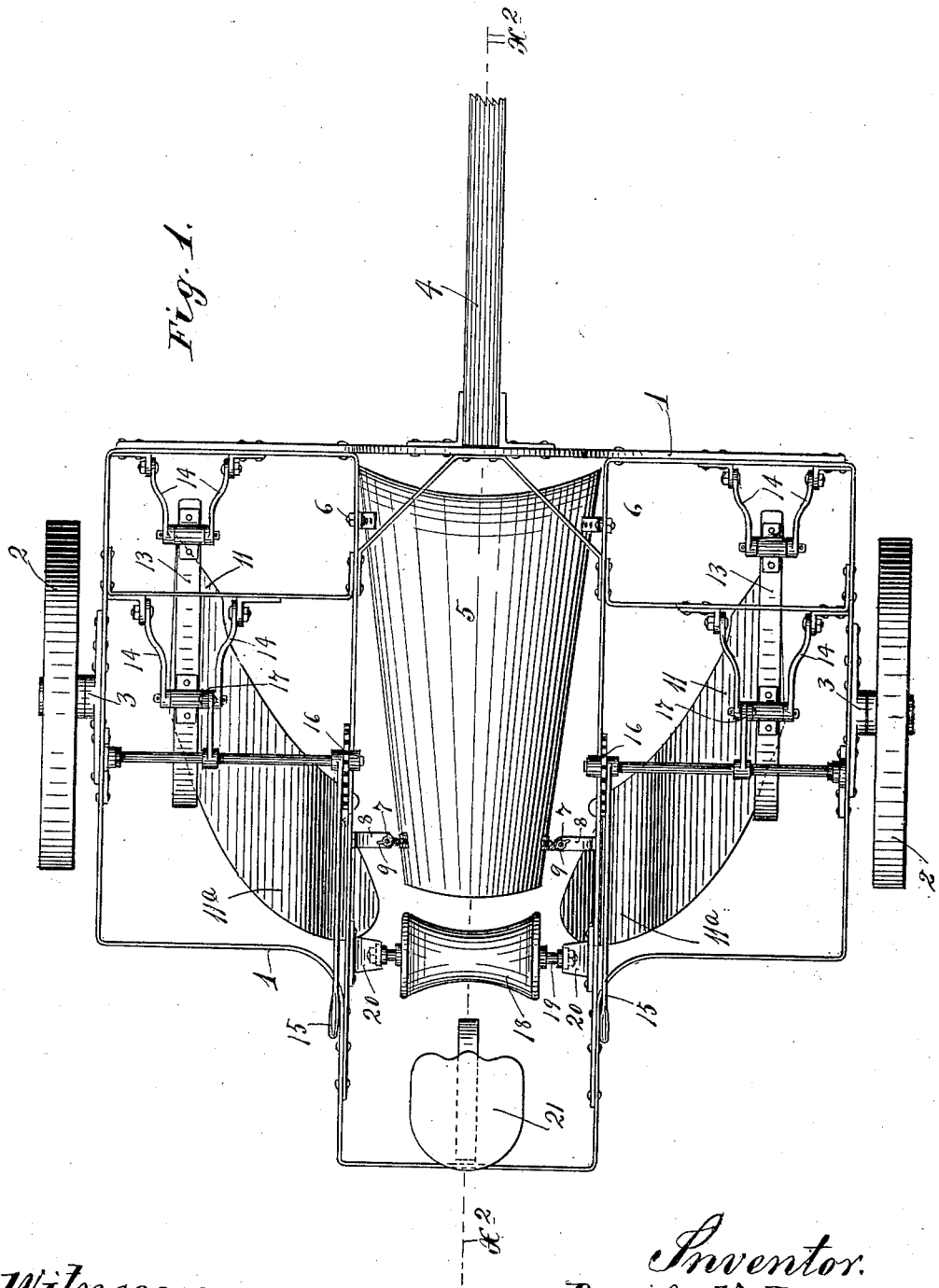

No. 747,218. PATENTED DEC. 15, 1903.
D. V. PLANTS.
DEVICE FOR COVERING BUSH FRUITS.
APPLICATION FILED MAY 9, 1903.
NO MODEL. 2 SHEETS—SHEET 1.

Witnesses
A. H. Opsahl.

Inventor.
David V. Plants.
By his Attorneys.
Williamson & Merchant

No. 747,218. PATENTED DEC. 15, 1903.
D. V. PLANTS.
DEVICE FOR COVERING BUSH FRUITS.
APPLICATION FILED MAY 9, 1903.
NO MODEL. 2 SHEETS—SHEET 2.
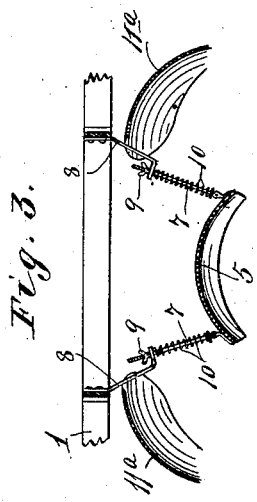
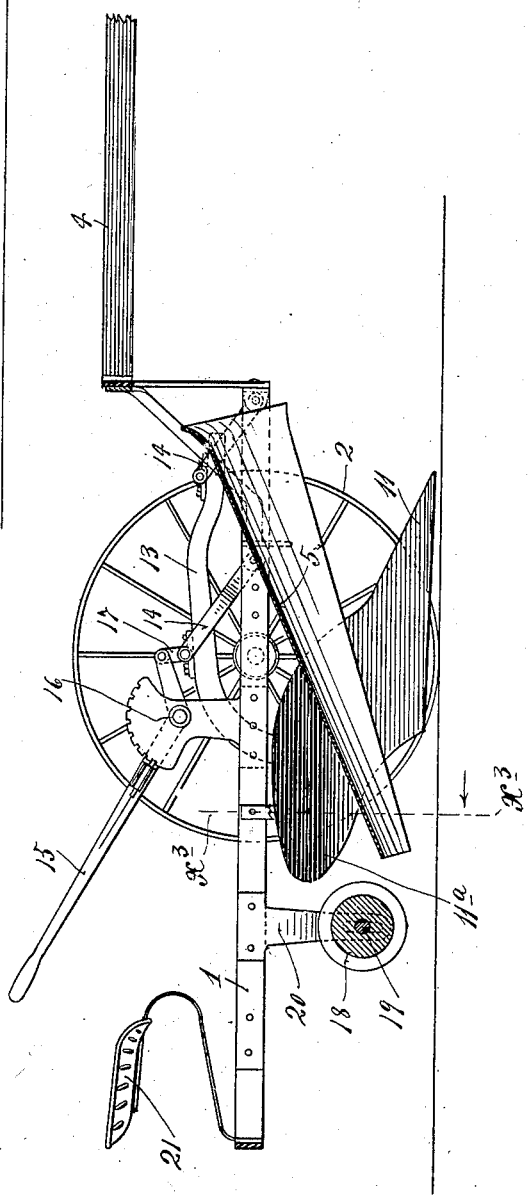
Witnesses.
A. H. Opsahl.
Inventor.
David V. Plants.
By his Attorneys.
Williamson & Merchant No. 747,218. Patented December 15, 1903.

UNITED STATES PATENT OFFICE.

DAVID V. PLANTS, OF LONG LAKE, MINNESOTA.

DEVICE FOR COVERING BUSH FRUITS.

SPECIFICATION forming part of Letters Patent No. 747,218, dated December 15, 1903.

Application filed May 9, 1903. Serial No. 156,362. (No model.)

*To all whom it may concern:*

Be it known that I, DAVID V. PLANTS, a citizen of the United States, residing at Long Lake, in the county of Hennepin and State of Minnesota, have invented certain new and useful Improvements in Devices for Covering Bush Fruits; and I do hereby declare the following to be a full, clear, and exact description of the invention, such as will enable others skilled in the art to which it appertains to make and use the same.

My invention has for its object to provide a simple and efficient machine for bending down and covering bush fruits and shrubs which in cold climates require to be covered in the winter-time; and to this end it consists of the novel devices and combinations of devices hereinafter described, and defined in the claims.

The invention is illustrated in the accompanying drawings, wherein like characters indicate like parts throughout the several views.

Figure 1 is a plan view of the complete machine. Fig. 2 is a vertical longitudinal section taken on the line $x^2\,x^2$ of Fig. 1; and Fig. 3 is a detail in transverse vertical section taken on the line $x^3\,x^3$ of Fig. 2, some parts being broken away.

The truck of the machine is made up of an angular skeleton frame 1, preferably formed of steel, and truck-wheels 2, suitably journaled on trunnions 3, projected outward from the sides of said frame. The front bar of the frame 1 is bowed upward at its central portion, so as to afford clearance to the bushing, and to this bowed portion is attached a pole 4. The central portion of the frame 1 is left clear for the movements of a concave and preferably tapered plate, herein termed the "bending-plate." This bending-plate 5 is advisably formed from sheet metal and is pivoted at 6 to the frame 1, with freedom for vertical movements at its contracted rear end. To the sides and rear portion of the bending-plate 5 bolts 7 are pivotally attached, and the upper ends of these bolts work freely through the depending ends of brackets 8, secured to the overlying bars of the frame 1, as best shown in Fig. 3. On the threaded upper ends of the bolts 7 are nuts 9, by means of which the rear end of the bending-plate 5 may be adjusted vertically. Springs 10, coiled around the bolts 7 between the brackets 8 and the rear end of the plate 5, yieldingly press the said free end of the plate downward.

On each side of the bending-plate 5 is a plow, which two plows are arranged to turn over the dirt raised from the furrow onto the bushes bent downward by the bending-plate 5. Otherwise stated, one of the plows has a right-hand moldboard and the other has a left-hand moldboard. The plows are indicated by the numeral 11 and their moldboards by the character 11ª. The plow-beams 13 of the said plows are connected to the sides of the frame 1 by parallel divided or double links 14. The plows are independently raised and lowered by suitable latch-levers 15, which are pivoted to coöperating latch-segments 16, secured on the intermediate bars of the frame 1. The short forward ends of the said levers 15 are connected to the plow-beams by short links 17.

In longitudinal line with the bending-plate 5 and located at the rear thereof is a packing-roller 18, the shaft 19 of which is detachably, but rigidly, secured in the depending ends of a pair of brackets 20, rigidly secured to the intermediate bars of the frame 1. This packing-roller 18 is preferably a concave roller, which will tend to round over the top of the ridge of dirt thrown over the bushes.

The numeral 21 indicates the driver's seat, which is supported from the rear central portion of the frame 1 in a position where the operator seated thereon may easily grip the rear ends of the levers 15.

The operation of the device is probably clear from the foregoing description; but the following brief statement may be desirable: When in operation both plows are of course lowered, and the two horses, which by the ordinary devices are hitched to the pole 4, will be driven straddle of the row of bush fruit or shrubs to be covered. In this way the bending-plate 5 is drawn against the upright bushes and under the advancement of the machine gradually bends the same over and down into the ground. The plows are so arranged that they will throw the dirt over the bushes while they are still held down by the rear end of the bending-plate 5. The bending-plate being tapered serves to gather in the straggling portions of the bushes, as well as to press the same downward into the ground. The springs 10 yieldingly press downward the free end of the bending-plate, but permit the same to yield, and thus prevent breaking of exceptionally stiff or rigid bushes. The packing-roller 18 follows closely after the plows and bending-plate and packs the dirt over the bushes before they have been entirely released from the said bending-plate.

By actual usage of the device I have found the same to be extremely efficient for the purposes had in view and to be a great saver of labor. The machine is of course capable of many modifications within the scope of the invention as herein set forth and claimed.

What I claim, and desire to secure by Letters Patent of the United States, is as follows:

1. In a machine of the character described, the combination with a truck, of an inclined bending-plate and a pair of plows connected to said frame and held thereby against movements with respect to each other transversely of the machine, said plows being located one on each side of said bending-plate, and arranged to turn the earth over the bent bushes while they are subject to said bending-plate, substantially as described.

2. In a machine of the character described, the combination with a truck, of an inclined bending-plate pivoted at its forward end to the truck-frame and yieldingly connected thereto at its rear end, of a pair of reversely-acting plows located one on each side of said bending-plate, and parallel links connecting said plows to the truck-frame, with freedom for vertical movements, but holding the same against lateral movements with respect to each other and to said bending-plate, substantially as described.

In testimony whereof I affix my signature in presence of two witnesses.

DAVID V. PLANTS.

Witnesses:
 ELIZABETH H. KELIHER,
 F. D. MERCHANT.